United States Patent [19]

Furman

[11] Patent Number: 5,152,925

[45] Date of Patent: Oct. 6, 1992

[54] POLYMERIC DEFOAMER COMPOSITIONS

[75] Inventor: Robert Furman, Columbus, Ga.

[73] Assignee: Exxon Chemical Patents Inc., Linden, N.J.

[21] Appl. No.: 573,680

[22] Filed: Aug. 27, 1990

[51] Int. Cl.$^5$ .................. B01D 17/00; B01J 13/00
[52] U.S. Cl. .................... 252/321; 252/314; 252/358; 162/168.7
[58] Field of Search ............ 252/321, 358, 314; 162/168.1

[56] References Cited

U.S. PATENT DOCUMENTS

| | | | |
|---|---|---|---|
| 3,793,223 | 2/1974 | Lichtman et al. | 252/358 |
| 3,951,853 | 4/1976 | Suwala | 252/358 |
| 4,021,365 | 5/1977 | Sinka et al. | 252/321 |
| 4,107,073 | 8/1978 | Maciaszek | 252/321 |
| 4,225,456 | 9/1980 | Schmidt et al. | 252/321 |
| 4,559,162 | 12/1985 | Abel et al. | 252/321 |
| 4,664,844 | 5/1987 | Bergold | 252/358 |
| 4,734,205 | 3/1988 | Jacques et al. | 210/708 |
| 4,968,449 | 11/1990 | Stephenson | 252/358 |

Primary Examiner—Richard D. Lovering
Assistant Examiner—N. Bhat

[57] ABSTRACT

Polymeric defoamer compositions are prepared from hydroxyalkylacrylate or methacrylate containing polymers which are then solubilized in an organic carrier system. The polymers are effective defoamers and drainage aids for brown stock washers, screen rooms, and in other paper-making operations. The compositions, which may be petroleum oil-free, avoid many of the deleterious effects of conventional petroleum oil-based EBS defoamers.

16 Claims, No Drawings

POLYMERIC DEFOAMER COMPOSITIONS

BACKGROUND OF THE INVENTION

1. Field of the Invention

The present invention relates to the use of hydroxyalkylacrylate containing copolymers dissolved in organic liquids to produce compositions which are effective defoamers for use in pulp and paper mill operations, particularly for use in brown stock washers.

2. Description of the Prior Art

The problem of foam control in pulp and paper mill operations is a continuing one. Generally, it has been most effectively dealt with by using various petroleum oil-based compositions containing an alkylene diamide and/or hydrophobic silica (silicone coated silica). Oil-based amide defoamers contain a minimum of two ingredients: a wax with a high melting point (usually a fatty diamide) dispersed in a petroleum hydrocarbon oil carrier. The most commonly used diamide is ethylenebis(stearamide), but other diamides or mixtures of diamides can also be found in defoamer blends. Typically, the weight fraction of diamide is between 2 and 8% whereas the weight fraction of the petroleum oil is well over 80%. The oil carrier varies in composition from one defoamer to another but generally consists of a low viscosity mineral oil with paraffinic or cycloparaffinic hydrocarbons. In addition to the diamides and petroleum oil, the blends may also contain other agents such as hydrophobic silica and silicone oil, various emulsifiers and stabilizers, but these constituents generally comprise less than 10% of the formulation.

While these diamide-based compositions are effective defoamers for brown stock washers in pulp mills, they have recently been suspected of contributing to deposition problems in various locations in the mills. (Dorris et al. "Analysis of Amide Defoamers in Kraft Mill Pitch Deposits," J.Pulp & Paper Science, 11:5, J149-J154, September 1985) And recently there has been evidence that the petroleum oil in this type of defoamer is an indirect source of the 2,3,7,8-tetrachlorodibenzop-dioxin (TCDD) and 2,3,7,8-tetrachlorodibenzofuran (TCDF) produced in kraft bleach plants. (Allen et al. manuscript distributed at the 8th International Symposium on Chlorinated Dioxins and Related Compounds, Umes, Sweden, Aug. 21-26, 1988) In addition, they have not been found useful on paper machines because they are not able to completely disperse in water and thus they have been found to cause deposits and/or oil spots on the paper produced. Also, diamides are considered a primary source of pitch deposit build-up which is a major problem.

Alternative petroleum oil-based defoamers have been prepared from a wide variety of chemicals. For example, U.S. Pat. Nos. 3,751,373 and 3,935,121 disclose defoamers based upon a combination of a fatty acid or alcohol, a polyethylene glycol mono- or di- ester of a fatty acid, a petroleum sulfonic acid, and 65-98% organic liquid. One example of a commercial aqueous defoamer is an aqueous emulsion of fatty alcohols—although it does not contain any petroleum oil phase, it does contain high melting waxes which are known to interfere with certain later processing steps. These defoamers are generally not as effective as those containing EBS and its homologues, but also do not cause the spotting problem on paper machines.

Therefore there is a need for an effective defoamer which does not contain EBS and/or other diamides, and preferably does not contain any petroleum oil. Accordingly, it is an object of the present invention to produce such defoamer compositions and to utilize them on brown stock washers and in other paper-making operations.

SUMMARY OF THE INVENTION

The present invention is directed to a water-insoluble defoamer composition which comprises a copolymer containing at least about 10 weight % of a hydroxyalkylacrylate or methacrylate dissolved in a suitable organic liquid carrier. The defoamer compositions are prepared by first preparing a copolymer and then dissolving it in organic liquids optionally containing one or more surfactants. A uniform solution of the copolymer in the organic liquid carrier is produced, which solution is an effective defoamer for brown stock washers.

DESCRIPTION OF THE PREFERRED EMBODIMENTS

The defoamer compositions of the present invention are produced by dissolving a copolymer containing at least about 10 weight % of a hydroxyalkylacrylate monomer in an organic liquid carrier.

Copolymers useful in the present invention are those water-insoluble copolymers obtained by copolymerizing a hydroxyalkylacrylate monomer with one or more monomers which will copolymerize therewith. Suitable hydroxyalkylacrylate monomers are of the general formula:

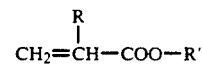

wherein R is hydrogen or methyl, preferably methyl, and R' is an alkyl group containing about 1 to about 8, preferably about 2 to 4, carbon atoms, and at least one hydroxy group, preferably a terminal hydroxy group. Examples of suitable R' groups include hydroxyethyl, hydroxypropyl, hydroxyisopropyl, and hydroxybutyl. The most preferred monomers include hydroxyethyl methacrylate and hydroxypropyl methacrylate.

Comonomers useful in preparing the copolymers include any non-ionic vinyl monomer which will readily copolymerize with the hydroxyalkyl acrylates and will form copolymers which are soluble in organic media. Examples of such monomers which may be used singly or in combinations include acrylates, methacrylates, styrene, acrylonitrile, vinyl alkyl ethers, fumaric and maleic acid diesters, vinyl acetate, and the like. Suitable acrylates and methacrylates contain about 2 to about 12, preferably about 3 to about 10, carbon atoms in the ester group. Specific examples include isobutyl acrylate, isobutyl methacrylate, 2-ethylhexyl acrylate, and 2-ethylhexyl methacrylate. Suitable vinyl alkyl ethers include vinyl methyl ether, vinyl ethyl ether, and the like. Suitable fumaric and maleic esters include dioctyl fumarate, dioctyl maleate, dibutyl maleate, and monoethylmaleate.

Suitable copolymers for use herein contain at least about 10 weight % of the hydroxyalkyl acrylate, preferably at least about 15 weight %, and most preferably at least about 20 weight %. Generally, as the hydroxyalkyl acrylate content increases so does the defoaming activity. Thus, for certain liquors the low levels of hydroxyacrylate content may not be sufficiently effective and higher levels will be required. The specific minimum level to obtain defoaming activity for a particular liquor can be determined by routine experimentation. The hydroxyalkyl acrylate content must not be so high that the copolymer precipitates out of the polymerization media or the organic liquids used to form the defoaming composition.

The copolymers may be prepared in any suitable manner, but generally they will be prepared in an organic media with a free radical generating catalyst which will dissolve in the media selected. Examples of suitable organic media include 2-ethyl-1-hexanol, isooctyl alcohol, diisodecyl phthalate, diisooctyl phthalate, dihexyl phthalate, and mixtures thereof. Examples of suitable organic soluble free radical generating catalysts include azo catalysts such as azobisisobutyronitrile, 2,2'-azobis(2,4-dimethylpentanenitrile) and 2,2'-azobis(2-methylbutanenitrile). Alternatively, redox catalyst systems such as bromate/sulfide or persulfate/ferrous systems may be used. Stil further alternatively, peroxides such as benzoyl peroxide may be used to generate the free radicals. The catalyst is conveniently predissolved in an organic solvent such as acetone or in a portion of the organic media or in one component of a two-component media system. The catalyst may either all be present at the beginning of the polymerization or it may be added incrementally in a conventional manner. Generally the polymerization will be performed at an elevated temperature of about 100° to 200° F., though this is not considered critical.

To form the defoamer compositions of the present invention, the hydroxyalkyl acrylate containing copolymer, generally still in the organic media in which it had been prepared, is dissolved in a suitable organic liquid system. While essentially any organic liquid may be used, preferably no petroleum oils are used due to the spotting problem referred to previously. Thus preferred suitable organic liquids include the same organic solvents used in preparing the hydroxyalkyl acrylate polymers, synthetic liquid polymers such as polybutenes and other hydrocarbons, dialkyl phthalates, fatty acid esters, and the like, and mixtures thereof. A particularly preferred combination of organic liquids to produce a clear, colorless defoamer composition is a mixture of about 20 to 80 parts of a polybutene having a molecular weight of about 400 and about 80 to 20 parts of a phthalate ester, preferably diisodecylphthalate.

The defoamer compositions contain about 10 to 50 weight percent of the hydroxyalkyl acrylate copolymer and about 50 to 90 weight percent of the organic media. Preferably, the compositions contain 15 to 40 weight percent copolymer and about 60 to 85 weight percent organic media. Most preferably, the compositions contain about 20 to 35 weight percent copolymer and about 65 to 80 weight percent organic media.

In addition to the hydroxyalkylacrylate copolymer and the organic liquid media, the defoamer compositions may further contain one or more surfactants to improve the efficiency of the defoamer compositions. Examples of suitable surfactants include polyethylene glycol, polypropylene glycol, polypropylene triol, butoxy polypropylene polyethelene glycol, dimethylpolysiloxane, alkoxylated dimethylpolysiloxane, and the like. Furthermore, the compositions may also contain other conventional defoamer additives such as hydrophobic silica, waxes, fatty alcohols, fatty acids, and ethoxylated fatty acids. The surfactants and other materials, if present, will normally represent less than about 5 weight percent of the total defoamer composition. Routine experimentation will determine the specific surfactants and other materials to be used for a particular application.

The defoamer compositions of this invention have particular utility in controlling foam, i.e. inhibiting foam formation and destroying existing foam, in a variety of pulp and paper mill operations. Generally, the defoamers will find primary use in treating foams that could previously not be treated with diamide defoamers due to the deposit and/or pitch build-up problems referred to above. The defoamer compositions are especially useful for controlling foam which occurs in brown stock washing operations. Furthermore, they should find use whereever dilute black liquors are found in a paper mill. By "dilute" is meant that the concentration of total solids in the liquid phase is generally below about 5%, preferably below about 2%, and most preferably below about 1%, all by weight. As such they may be used in controlling foam in screen rooms, on paper machines, in paper coatings, and to treat the plant effluent which is going to a waste treatment facility.

The defoamer composition may be added to the system neat, or it may be further diluted with additional organic liquids, though there is generally no necessity to do so. Since the the present defoamer compositions are water-insoluble, they may be used by direct addition into the brown stock vats or by injection into shower headers or vat dilution lines.

The quantity of the defoamer compositions required to control foam will obviously vary depending upon the specific nature of the foam to be treated and upon the individual components used to prepare the defoamers. Generally, however, a quantity of defoamer from about 0.5 to 5 pounds per ton of pulp will be suitable, preferably about 1 to 2 pounds.

The following examples are presented for purposes of illustration and not limitation. All parts and percents are by weight unless otherwise specified.

EXAMPLE I

Preparation of Hydroxyalkylacrylate Copolymer

A copolymer containing 20% hydroxyethyl methacrylate (HEMA) and 80% 2-ethylhexyl acrylate (EHA) was prepared from 70 g HEMA and 280 g EHA as follows:

350 g 2-ethyl-1-hexanol, ⅓ of the HEMA and ⅓ of the EHA were charged into a reaction kettle which was closed and sparged with nitrogen. The mixture was heated to 155° F. and the temperature was allowed to stabilize. The mixture was colorless and clear.

A catalyst solution was prepared by dissolving 5.25 g azobisisobutyronitrile in 49 g acetone. ⅓ of the solution was added over 8.5 minutes with stirring continuing while an ice bath being used to control the exotherm, limiting the temperature rise to 5°-6° F. After one hour, ⅓ of the remaining HEMA and EHA was added over a 15 minute period. An exotherm of 3°-4° F. was observed. After another hour, another ⅓ of the remaining HEMA and EHA was added followed by the second third of the catalyst solution. After another hour, the balance of the HEMA and EHA was added followed by the balance of the catalyst solution. The reaction was allowed to continue for an additional 2.5 hours with the temperature maintained at 155°-165° F. throughout the period.

The resultant copolymer solution was colorless and hazy. It had a viscosity of 1800 cps as measured by a Brookfield viscometer, spindle 3, at 50 rpm.

EXAMPLE II

To evaluate the defoaming capability of the copolymer of Example I, the copolymer was dissolved in a suitable organic liquid and then a conventional foam cell tester was utilized. The foam cell tester uses a graduated glass cylinder incremented every ½ cm for 30 cm with the bottom of the cylinder fitted with a piece of rubber tubing attached to a steel pipe leading to a centrifugal pump. Another piece of piping, with an aspirator attached, led out of the top of the pump and into the top of the cylinder.

Black liquor heated to 180° F. from the first stage filtrate of Georgia Pacific's Brunswick, Georgia, plant was placed in the cylinder and the pump turned on. The pump was connected to a rheostat to control the percent output of the pump to 60-80%. The black liquor was sucked into the pump and recirculated back into the top of the cylinder until the pump was turned off. The recirculation of the liquor together with the aspirator created foam and air entrainment. When the foam had risen to 20 cm, the specified amount of the defoamer composition was injected and a timer turned on. The time required this is known as "knock down." The foam was then allowed to rise to 20 cm while the height of the foam was determined every 30 sec to determine the "stamina" of the defoamer composition.

The organic liquids used to prepare the defoamer compositions were DIDP (diisodecyl phthalate) and a polybutene (Indopol L-50 of Amoco). The composition tested and the results obtained were:

| | Defoamer Composition | | Results Observed |
|---|---|---|---|
| 1. | Copolymer | 30% | Good knockdown, poor stamina |
| | DIDP | 70% | |
| 2. | Copolymer | 30% | Excellent knockdown and stamina, |
| | Polybutene | 70% | product hazy |
| 3. | Copolymer | 30% | Excellent knockdown and stamina, |
| | DIDP | 20% | product clear and colorless |
| | Polybutene | 50% | |

EXAMPLE III

The procedure of Examples I and II were repeated to prepare and evaluate a series of different copolymers to determine their defoaming capacity. The monomers used to prepare the copolymers were: IBA - isobutyl acrylate, HEMA - 2-hydroxyethyl methacrylate, EHA - 2-ethylhexyl acrylate, STY - styrene, VST - vinyl stearate, and HPMA - 2-hydroxypropyl methacrylate. The copolymers prepared and the defoaming tests results using a defoaming composition containing 30% of the copolymer, 20% diisodecylphthalate, and 50% Amoco L-50 polybutene were:

| | Copolymer Composition | Results Observed |
|---|---|---|
| 1. | 80% IBA, 20% HEMA | Excellent defoaming |
| 2. | 80% EHA, 20% IBA | No defoaming activity |
| 3. | 80% IBA, 20% STY | No defoaming activity |
| 4. | 80% IBA, 20% VST | No defoaming activity |
| 5. | 80% IBA, 20% HPMA | Excellent defoaming |
| 6. | 85% IBA, 15% HEMA | Fair/poor defoaming |
| 7. | 75% IBA, 25% HEMA | Outstanding defoaming |

EXAMPLE IV

The procedure of Examples I and II was repeated except that in addition to the copolymer, diisodecyl phthalate, and polybutene, the compositions further contained a water-soluble surfactant having a cloud point of about 70°-100° F. The surfactants evaluated at loadings ranging from 0.25 to 3% based upon Composition 3 of Example II were:
 a. Pluronic L 61 of BASF, a polypropylene-polyethylene glycol
 b. Polyethylene glycol mono and di esters of tall oil fatty acids
 c. B-8873 silicone surfactant of Goldschmidt Chemical Corp., Hopewell, VA.
 d. DC-198 silicone surfactant of Dow Corning Co.

In each case, the defoaming activity of the composition remained excellent while the drainage properties were improved by the presence of the surfactants.

What is claimed is:

1. A defoamer composition comprising about 10 to 50 weight % of a copolymer dissolved in about 50 to 90 weight % of an organic liquid, wherein the copolymer is prepared from (i) at least about 10 weight % of a hydroxyalkyl acrylate monomer of the formula:

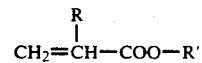

wherein R is hydrogen or methyl and R' is an alkyl group containing about 1 to about 8 carbon atoms and at least one hydroxy group and (ii) at least one non-ionic vinyl monomer which copolymerizes with the hydroxyalkyl acrylate.

2. The defoamer composition of claim 1, wherein R is methyl and R' is selected from the group consisting of 2-hydroxyethyl, 2-hydroxypropyl, 2-hydroxyisopropyl, and hydroxybutyl.

3. The defoamer composition of claim 1, wherein the hydroxyalkyl acrylate monomer is 2-hydroxyethyl methacrylate or 2-hydroxypropyl methacrylate.

4. The defoamer composition of claim 1, wherein the non-ionic vinyl monomer is selected from the group consisting of acrylates having about 2 to about 12 carbon atoms in the ester group, methacrylates having about 2 to about 12 carbon atoms in the ester group, acrylamide, methacrylamide, styrene, acrylonitrile, vinyl alkyl ethers having about 1 to about 6 carbon atoms in the alkyl group, vinyl acetate, difumarates having about 2 to about 12 carbon atoms in the ester group, and dimaleates having about 2 to about 12 carbon atoms in the ester group.

5. The defoamer composition of claim 4, wherein the non-ionic vinyl monomer is an acrylate or methacrylate selected from the group consisting of isobutyl acrylate, isobutyl methacrylate, 2-ethylhexyl acrylate, and 2-ethylhexyl methacrylate.

6. The defoamer composition of claim 1, wherein the hydroxyalkyl acrylate monomer is at least about 15 weight % of the copolymer.

7. The defoamer composition of claim 1, wherein the hydroxyalkyl acrylate monomer is at least about 20 weight % of the copolymer.

8. The defoamer composition of claim 1, wherein the copolymer comprises about 15 to 40 weight % copolymer and about 60 to 85 weight % organic liquid.

9. The defoamer composition of claim 1, wherein the copolymer comprises about 20 to 35 weight % copolymer and about 65 to 80 weight % organic media.

10. The defoamer composition of claim 1, wherein the organic liquid is selected from the group consisting of synthetic liquid hydrocarbon polymers, dialkyl phthalates having about 6 to 12 carbon atoms in each alkyl group, esters of fatty acids, 2-ethyl-1-hexanol, isooctyl alcohol, and mixtures thereof.

11. The defoamer composition of claim 1, wherein the organic liquid comprises a mixture of about 20 to 80 parts of a polybutene having a molecular weight of about 400 and about 80 to 20 parts of a dialkyl phthalate having about 6 to 12 carbon atoms in each alkyl group.

12. The defoamer composition of claim 11, wherein the dialkyl phthalate is diisodecylphthalate.

13. The defoamer composition of claim 1, further containing a surfactant.

14. The defoamer composition of claim 13, wherein the surfactant is selected from the group consisting of polyethylene glycol, polypropylene glycol, polypropylene triol, butoxy polypropylene-polyethelene glycol, dimethylpolysiloxane, and alkoxylated dimethylpolysiloxane.

15. The defoamer composition of claim 1, further containing a defoamer additive selected from the group consisting of hydrophobic silica, waxes, fatty alcohols, and fatty acids.

16. A method of reducing the foam generated by a liquid present in a brown stock washer in a pulp mill comprising adding to the liquid a foam-reducing amount of the defoamer composition of claim 1.

* * * * *